United States Patent [19]

Pritchard et al.

[11] 4,314,277

[45] Feb. 2, 1982

[54] INPUT-WEIGHTED TRANSVERSAL FILTER TV GHOST ELIMINATOR

[75] Inventors: Dalton H. Pritchard, Princeton, N.J.; Alfred C. Schroeder, Southampton, Pa.

[73] Assignee: RCA Corporation, New York, N.Y.

[21] Appl. No.: 147,629

[22] Filed: May 7, 1980

[51] Int. Cl.³ .............................................. H04N 5/21
[52] U.S. Cl. ..................................... 358/167; 358/905
[58] Field of Search ......................... 358/167, 36, 905; 455/303, 305, 306, 307; 328/167; 333/165, 166

[56] References Cited

U.S. PATENT DOCUMENTS

| | | | |
|---|---|---|---|
| 3,935,536 | 1/1976 | Kimura et al. | 358/905 |
| 4,044,381 | 8/1977 | Shimano et al. | 358/167 |
| 4,127,874 | 11/1978 | Iwasawa et al. | 358/905 |
| 4,158,209 | 6/1979 | Levine | 358/31 |
| 4,162,411 | 7/1979 | Sakaue | 333/165 |

OTHER PUBLICATIONS

Sakaue et al., "Digitally-Controlled and Electrically--Programmable CCD Transversal Filter LSI," *Proceedings of 5th International Conference on Charge-Coupled Devices,* (1979), pp. 222-229.
Makino et al., "A Fully Automatic Ghost Canceller," *IEEE Trans. on C.E.,* vol. CE-24, No. 3, Aug. 1978, pp. 267 et seq.
Ciciora, "A Tutorial on Ghost Cancelling in Television Systems," *IEEE Trans. on C.E.,* vol. CE-25, Feb. 1979, pp. 9-44.

*Primary Examiner*—John C. Martin
*Attorney, Agent, or Firm*—Paul J. Rasmussen; William H. Meagher; W. Brinton Yorks, Jr.

[57] ABSTRACT

A television signal ghost eliminator is described, including a transversal filter having an input terminal, an output terminal at which a processed video signal is produced, a plurality of signal processing stages serially coupled between the input and output terminals, and a plurality of input taps coupled to the signal processing stages. A detected video signal is applied to the input terminal of the transversal filter and is transferred through the serially coupled stages. A circuit is responsive to the processed video signal for developing a plurality of weighting function signals which are applied to the input taps. The weighting function signals applied to the taps are combined with the detected video signal as it appears at the tapped stages, resulting in reduction in ghost signal components in the processed video signal which is produced at the output terminal of the transversal filter.

10 Claims, 4 Drawing Figures

INPUT-WEIGHTED TRANSVERSAL FILTER TV GHOST ELIMINATOR

This invention relates to television signal ghost eliminators and, in particular, to a television signal ghost eliminator which employs an input-weighted transversal filter in a recursive system.

A common source of television signal interference is ghost images resulting from the reception of delayed replicas of the transmitted television signal. The ghost image generally results from the reception of a signal which has been reflected from a building or other object, with the path of the reflected signal being different than the direct path of the main signal. The received reflected signal is usually of a lesser amplitude than the main signal and is delayed in time relative to the main signal, and thus may be of any phase relationship with respect to the main signal. The displayed ghost signal can therefore be of varying intensity and polarity with respect to the desired signal image.

The problem of ghosts is not confined to signals received by a television antenna, but can frequently occur in cable television systems due to improper termination of cables. Signal reflections can then occur in the transmission line, which are a source of ghost interference. In addition, misalignment within the signal processing path of the receiver itself can be a source of ghost interference. Such internally generated ghosts can even be processed and displayed prior to the occurrence of the main signal, resulting in a leading, rather than a delayed, ghost image.

A basic ghost cancellation technique of the prior art comprises a delay line and a subtractor network inserted in the signal processing path subsequent to video signal detection. The main signal is delayed by the delay line in parallel with the undelayed signal path, by the same time that the ghost signal is delayed with respect to the main signal. The ghost signal is then subtracted from the delayed main signal, with the delayed main signal aligned in time with the ghost signal, so that the ghost is cancelled. However, the delayed signal will also introduce a new ghost into the main signal known as a residual ghost, which is reduced in amplitude with respect to the original ghost and delayed from the main signal by twice the delay time of the original ghost.

The residual ghost may be cancelled in the same manner as the original ghost. However, cancellation of the residual ghost in the manner described above will result in the creation of a residual of the residual ghost. Moreover, the cancellation of residual ghosts as described above adds additional complexity to the ghost cancellation system.

An improved ghost cancellation technique which does not create residual ghosts is the recursive ghost canceller. In a system using this technique, the ghost is detected and the main signal, including the ghost, is sampled. The samples are weighted and summed to develop a pseudo-ghost which is of opposite polarity to the original ghost. The pseudo-ghost is then fed back and added to the main signal to eliminate the original ghost. In this typical recursive ghost canceller, a delay line is used to develop the pseudo-ghost signal. The main signal, including the ghost, is applied to the input of the delay line and samples of the signal are taken from taps on the delay line, the taps being characterized as output taps. The output tapped signals are weighted and summed to develop the pseudo-ghost signal. Alternatively, the main signal may be sampled and the samples applied in weighted fashion to input taps of a delay line. The weighted samples are then summed in the delay line to develop the pseudo-ghost signal.

In order to prevent the ghost canceller from oscillating, the loop gain of the taps in the system must be carefully controlled so as not to exceed unity. This is generally accomplished by limiting the maximum output of integrators in series with the weighted samples and the delay line taps. The outputs of the integrators must maintain a steady state value between successive update periods.

The recursive ghost cancellation systems referred to above all require components which sum the weighted samples and an adder of subtractor (depending on the polarity of the pseudo-ghost) to cancel the original ghost system. It is desirable to eliminate these components, if possible, to reduce the complexity of the ghost cancellation system.

In accordance with the principles of the present invention, a television ghost eliminator is provided which utilizes an input-tap weighted recursive transversal filter. A video signal, which may include one or more ghost signal components, is applied to the input of the transversal filter delay line. The video signal at the output of the transversal filter delay line is sampled and differentiated to detect the ghost components and a reference signal derived from the main signal. The reference signal is then applied to a second delay line, operated in synchronism with the transversal filter delay line, to develop timed sampling pulses. The timed sampling pulses and the detected ghost components are applied to a plurality of memory elements which store the detected ghost elements in a timed relationship. The detected ghost elements are applied to weighting function control circuits, together with the output of the transversal filter delay line, to control the transfer function of the transversal filter by means of input taps. The signals applied to the input taps are thus weighted as a function of the detected ghost components, and their combined effect on the transversal filter is to incrementally cancel the ghost in the video signal which is applied to the transversal filter delay line. At no point in the system are the weighted signals combined to develop a single pseudo-ghost signal, and hence no additional summing network or adder or subtractor is needed. Complexity in the ghost eliminator is thereby reduced.

Figure 1:
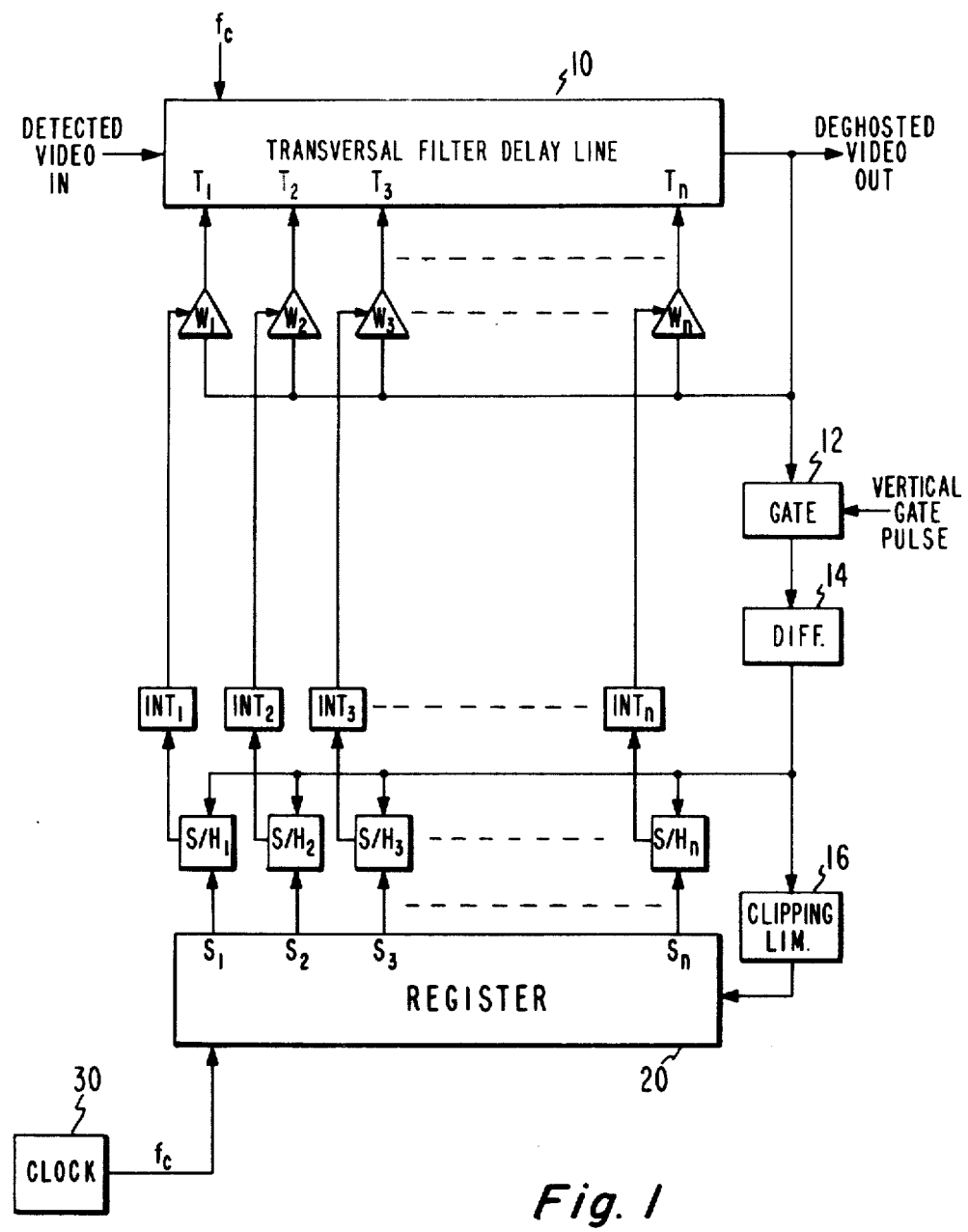
FIG. 1 illustrates in block diagram form a ghost cancellation system constructed in accordance with the principles of the present invention.

Referring to the ghost cancellation system of FIG. 1, a transversal filter delay line 10 is shown, which receives a detected video signal which may include a ghost signal component, and produces a deghosted video signal at its output. The transversal filter delay line may comprise, for instance, a charge-coupled device (CCD) delay line, in which the received video signal is clocked from stage to stage as it is processed for removal of the ghost signal. When a CCD delay line is used for the transversal filter delay line 10, a clock circuit 30 is provided which produces a clock signal $f_c$.

The transversal filter delay line 10 has a number of input taps $T_1, T_2, T_3, \ldots T_n$ coupled to individual points along the delay line. Signals present on the input taps are used to modify the transfer function of the filter as the video signal passes through it.

The video signal at the output of the transversal filter delay line 10 is applied to inputs of weighting function circuits $W_1, W_2, W_3, \ldots W_n$, and to a gate 12. The gate 12 provides a signal of a known characteristic to a differentiator 14 for detection of a ghost signal. In the example of FIG. 1, the gated signal is the first vertical synchronizing pulse of the video signal. The gate is activated in this instance by a vertical gate pulse.

The differentiator 14 differentiates the vertical synchronizing pulse, as well as any ghost signal components which accompany it. The resulting differentiated pulses indicate the existence and relative time location of the leading and trailing edges of the vertical synchronizing pulse and ghost signals that were passed by gate 12. The differentiated pulses are applied to inputs of sample-and-hold circuits $S/H_1, S/H_2, S/H_3, \ldots S/H_n$ and to a clipping limiter 16.

The clipping limiter 16 clips the differentiated pulses at a level just below the peak of the differentiated edge of the vertical synchronizing pulse and produces an amplified replica of the clipped portion of that pulse. This replica of the vertical synchronizing pulse is used as a reference pulse for timing the operation of the sample-and-hold circuits through a shift register 20.

The shift register 20 has a clocked propagation delay time equal to that of the transversal filter delay line 10. The shift register also has the same number and spacing of taps as that of the transversal filter delay line. Shift register 20 is clocked by the same clock signal $f_c$ as the transversal filter delay line. As the reference pulse is clocked down the shift register 20, it activates the sample-and-hold circuits to sample the differentiated ghost signals which are applied to the other inputs of the sample-and-hold circuits. The sample-and-hold circuits (and integrators) will therefore retain time sequential sampled values of the gated and differentiated ghost signals.

The samples held by the sample-and-hold circuits are applied to respective individual inputs of the weighting function circuits $W_1-W_n$ by way of respective integrators $INT_1, INT_2, INT_3, \ldots INT_n$ to regulate the magnitude of the transversal filter output signal which is fed back to each input tap of the transversal filter delay line. The transversal filter output signal is effectively multiplied by each integrated weighting function signal, and the resulting input tap signals are then used to modify the transfer function imparted to the detected video signal by the transversal filter. As the detected video signal travels through the transversal filter delay line, it is incrementally modified by the input tap weighting function signals so that the output signal summed at the output of the transversal filter will have the ghost signals removed. The ghost signals will be virtually completely eliminated after the transversal filter output signal has been repeatedly sampled by the gate signal and the integrators have settled to their final values for a steady-state ghost signal.

Figure 3:
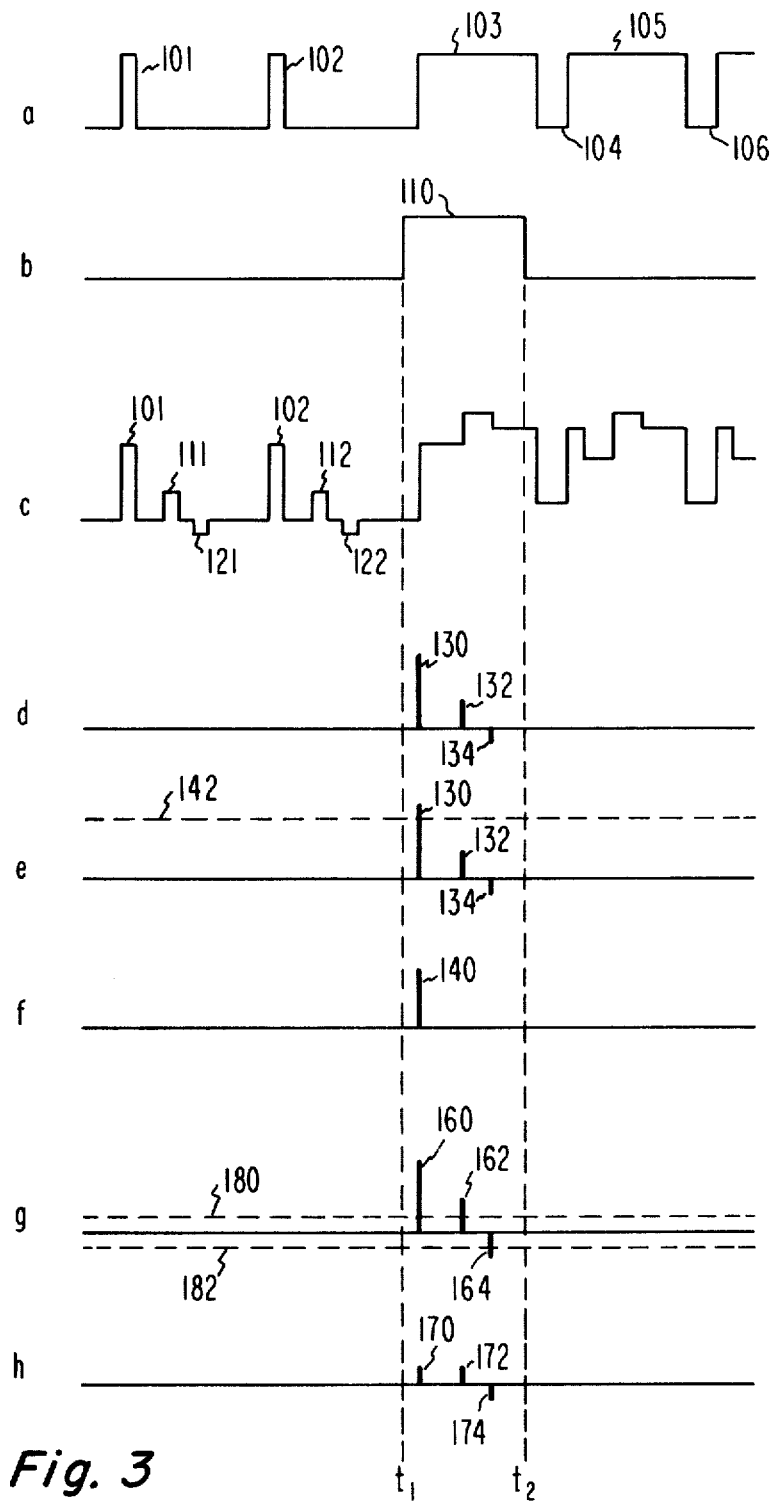
FIG. 3 illustrates waveforms depicting the operation of the ghost cancellation systems of FIGS. 1 and 2.

A typical synchronizing signal which is applied to gate 12 is shown in FIG. 3a. This signal includes equalizing pulses 101 and 102, followed by vertical synchronizing pulses 103 and 105, each of which is followed by serration pulses 104 and 106. The signal shown in FIG. 3a is a clean pulse; that is, it contains no ghost signal components.

The vertical gate pulse 110 which is applied to gate 12 is shown in FIG. 3b. The exact timing of this pulse is not critical. It is only necessary, for the embodiment shown in FIG. 1, that the pulse 110 begins prior to the leading edge of vertical synchronizing signal 103 which is to be sampled, and end prior to the occurrence of the succeeding serration pulse 104. The pulse 110 should have a duration which is at least equal to the delay time of the transversal filter delay line 10 to effect maximum ghost cancellation.

A synchronizing signal containing ghost signal components is shown in FIG. 3c. Equalizing pulse 101 is succeeded by a positive ghost signal 111 and a negative ghost signal 121. Likewise, equalizing pulse 102 is succeeded by ghost signals 112 and 122. The vertical synchronizing pulses are similarly distorted by vertical sync ghost signals. The portion of the first vertical synchronizing pulse which occurs during the gate pulse interval $t_1-t_2$ is bounded by dashed lines, and is the signal supplied to the differentiator 14 by the gate 12. After differentiation, the leading edge of the main vertical synchronizing pulse appears as a differentiated pulse 130, shown in FIG. 3d, and edges of the ghost signal components appear as differentiated pulses 132 and 134. These differentiated pulses are applied to the sample-and-hold circuits and to the clipping limiter 16. The clipping limiter 16 has a clipping threshold 142, shown in FIG. 3e, and produces at its output the reference pulse 140, shown in FIG. 3f. Pulse 140 is shifted through register 20 to sample and hold the ghost pulses 132 and 134 in a timed relationship. The differentiator 14 is constructed so that the pulses 132 and 134 are of sufficiently short duration so that they will be sampled and held in only one sample-and-hold circuit, respectively.

The maximum delay time (with respect to the main signal) of ghosts which may be cancelled by the ghost cancellation system of FIG. 1 is determined by the delay time of the transversal filter delay line 10. This in turn is determined by the number of stages of the CCD delay line, the clock frequency $f_c$, and the bandwidth of the applied video signal. The applied video signal in the NTSC system has a bandwith of 4.2 MHz. Thus, according to the Nyquist sampling theory, the frequency of the clock signal $f_c$ must be at least 8.4 MHz in order to recover the highest frequency components of the video signal. A clock signal frequency of 10.7 MHz was accordingly chosen for the clock signal $f_c$. The vertical synchronizing pulse has a duration which is slightly less than the duration of one-half of a video line, of approximately 27 $\mu$sec. At a clock rate of 10.7 MHz, 290 elements are required for the CCD delay line to cancel ghosts appearing within approximately one-half line of the main signal image. Illustratively, 256 elements may be used in the CCD delay line to achieve ghost cancellation for ghost delays approaching one-half line. Since many of the expected ghost images occur within this delay range, 256 elements have been found to produce satisfactory ghost cancellation. The clock frequency of 10.7 MHz in combination with the number of CCD elements allows cancellation of ghosts within the horizontal resolution of the television image.

When a CCD delay line is used for the transversal filter delay line 10 having 256 elements, it follows that n is 256 for this particular embodiment, and that the embodiment of FIG. 1 will have 256 input taps, 256 weighting function circuits, 256 sample-and-hold circuits and integrators, and that the shift register 20 has 256 stages. The values of the sample-and-hold circuits are updated each vertical blanking interval when a new vertical synchronizing pulse is sampled. These sample values are integrated and the ghost signal components appearing in the deghosted output signal are reduced as the integrators and the weighting function signals achieve their final values. Ghost signal component amplitudes which are reduced at least 36 db below the level of the desired video signal are considered satisfactory.

Figure 4:
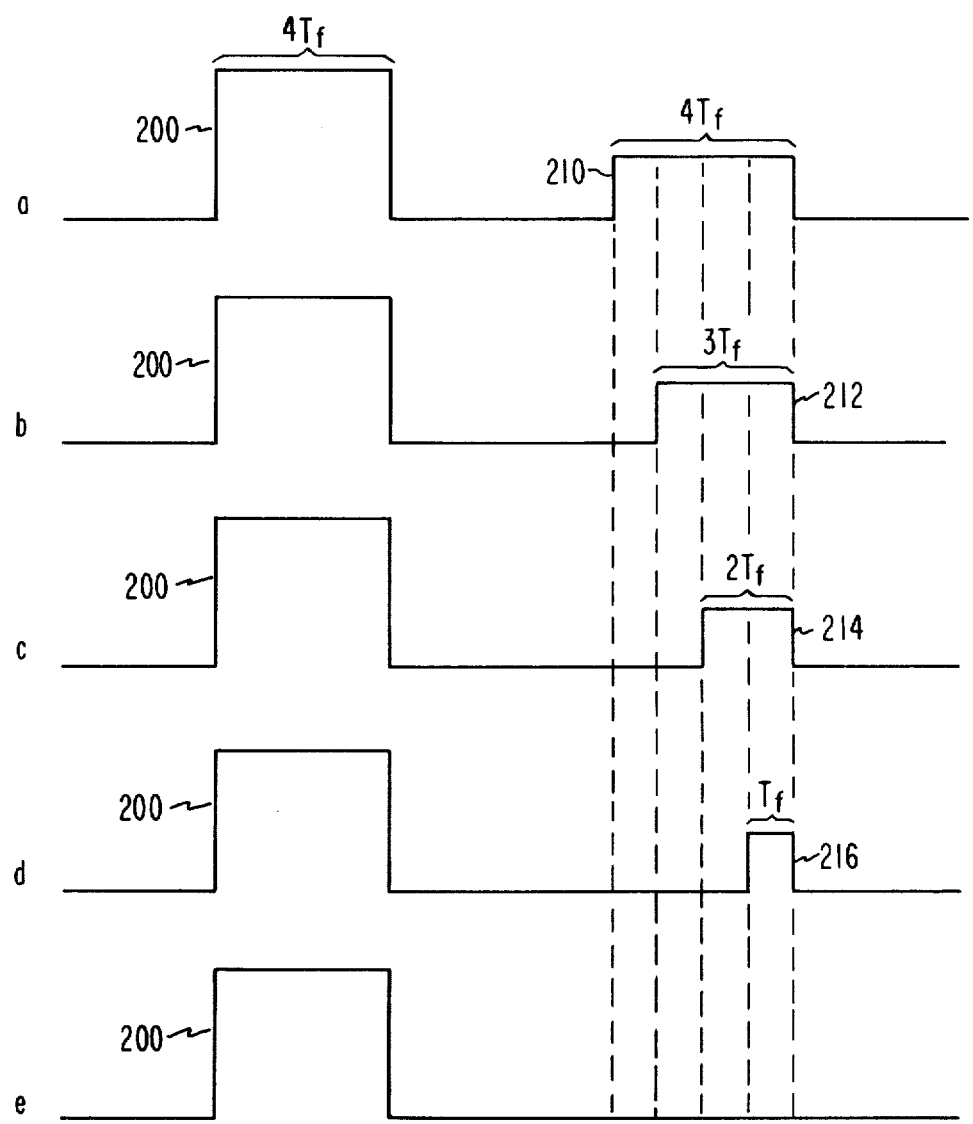
FIG. 4 illustrates waveforms which are used to explain the theory of operation of a ghost cancellation system of the present invention.

The theory of operation which underlies the incremental cancellation of the ghost signals by the weighted input taps of the transversal filter is explained by referring to the waveforms of FIG. 4. In this theoretical example, it is assumed that the video signal has a bandwidth of $4/T_f$, and that the transversal filter has four equally spaced elements and taps, clocked at a frequency of $1/T_f$. It is further assumed that the loop gain of the taps is approximately one, and that the system is stable (does not oscillate) at this loop gain value. A square wave video signal 200 in FIG. 4a has a given duration of $4T_f$, and its ghost 210 has a like duration, delayed from signal 200 by more than $4T_f$. The system is further assumed to be nonbandwidth limited. The progressive appearance of the main and ghost signals at each tap location for this theoretical system is shown in FIGS. 4b through 4e.

In FIG. 4b, the effect of the first tap is seen to be the reduction of the time duration of the ghost signal to three time intervals, or $3T_f$, as shown by ghost signal 212. The signal is then clocked to the second delay line element, at which the effect of the second tap is seen to be the reduction of the ghost signal to two time intervals $2T_f$, as shown by ghost 214 in FIG. 4c. The signal is clocked to the third delay line element, at which the effect of the third tap is seen to be the reduction of the ghost to one time interval $T_f$, as shown by ghost 216 in FIG. 4d. Finally, the signal is seen to be completely deghosted when the effect of the fourth tap is applied at the fourth delay line element, as shown in FIG. 4e.

It is to be pointed out that this example is a theoretical explanation of the implementation of the principles of the present invention. In an actual embodiment of the present invention, it is the sum of all the weighted tap functions which effect ghost cancellation, and the actual form of the ghost signal at any one tap location may not be precisely predicted by the theoretical example given above. The ghost signal is dynamically reduced through modification of the transfer function of the transversal filter.

Figure 2:
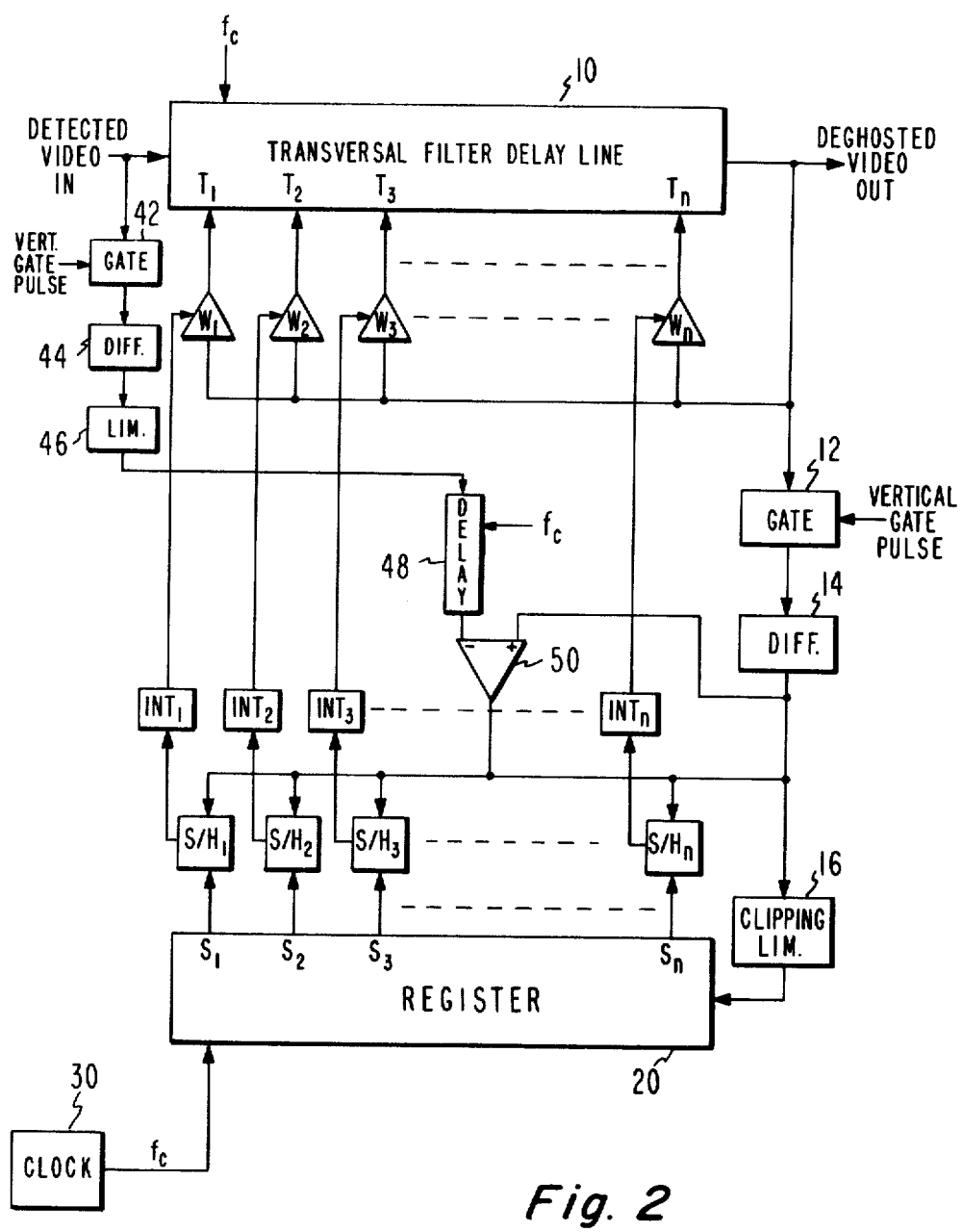
FIG. 2 illustrates, in block diagram form, a further embodiment constructed in accordance with the principles of the present invention.

An alternate embodiment of the ghost reduction system of FIG. 1 is shown in FIG. 2, in which like components bear the same reference numerals. In FIG. 2, a gate 42 and a differentiator 44 operate in the same manner as gate 12 and differentiator 14, respectively. The differentiator 44 produces differentiated pulses 160, 162, and 164 in response to the video signal of FIG. 3c, illustratively shown in FIG. 3g. These differentiated pulses correspond to pulses 130, 132, and 134 in FIG. 3e, respectively. The differentiated pulses are applied to a symmetrical limiter 46, having thresholds 180 and 182. The differentiated pulses appear at the output of the limiter 46 with amplitudes limited to the limiter thresholds, as shown by respective pulses 170, 172, and 174 in FIG. 3h. Since these differentiated and limited pulses lead their counterparts at the output of differentiator 14 by the delay time of the transversal filter, they are next delayed by a delay line 48, so that the pulses 170, 172, and 174 are in respective time coincidence with pulses 130, 132, and 134. The pulses 170, 172, and 174 are subtracted from their counterpart pulses 130, 132, and 134 by a comparator 50 and applied to the sample-and-hold circuits. The pulses thus applied to the sample-and-hold circuits are of the same amplitude relationship as pulses 130, 132, 134, but are equally amplitude reduced by the pulses 170, 172, and 174. The effect of this amplitude reduction is to improve the signal-to-noise performance of the system, since signal levels approaching the noise level of the system are subtracted from the pulses which are applied to the sample-and-hold circuits. The balance of the embodiment of FIG. 2 operates in the same manner as the ghost cancellation system of FIG. 1.

As previously mentioned, the transversal filter delay line of FIG. 1, as well as that of FIG. 2, may comprise a charge coupled device (CCD) delay line, such as that described in the article "Digitally-Controlled And Electrically-Programmable CCD Transversal Filter LSI," published in the *Proceedings of 5th Internation Conference on Charge-Coupled Devices* (1979) at page 222, et seq., and in U.S. Pat. No. 4,158,209. A typical input tap for a CCD delay line is illustrated by gate G2 in FIG. 1 of U.S. Pat. No. 4,158,209, and by the control gates shown in FIG. 3 of the aforementioned article appearing on page 227 of the *Proceedings*.

What is claimed is:

1. In a television receiver, including means for detecting a video signal which is subject to contamination by ghost signal components, a television signal ghost eliminator comprising:
   a transversal filter delay line including an input terminal, an output terminal at which a processed video signal is produced, a plurality of signal processing stages serially coupled between said input and output terminals, and a plurality of input taps, respective ones of which are coupled to respective ones of said signal processing stages;
   means for applying said detected video signal to said input terminal;
   means responsive to said processed video signal for developing a plurality of weighting signals; and
   means for effecting combination of respective ones of said weighting signals through respective ones of said input taps with said detected video signal as transferred to said respective signal processing stages to which said input taps are coupled in such manner as to cause reduction of ghost signal components in said processed video signal with respect to the ghost signal components of said detected video signal.

2. In a television receiver, including means for detecting a video signal which is subject to contamination by ghost signal components, a television signal ghost eliminator comprising:
   a transversal filter delay line, including an input terminal, an output terminal at which a processed video signal is produced, a plurality of signal processing stages serially coupled between said input and output terminals, and a plurality of input taps, respective ones of which are coupled to respective ones of said signal processing stages;
   means for applying said detected video signal to said input terminal;

means for effecting the transfer of said applied video signal from said input terminal to said output terminal through said signal processing stages;

means responsive to said processed video signal for developing a plurality of weighting signals; and means for processing said applied video signal at respective ones of said signal processing stages through the combination of respective ones of said weighting signals with said applied video signal as transferred to respective ones of said stages, said processing means comprising means for applying respective ones of said weighting signals to respective ones of said input taps, whereby said processing of said applied video signal causes the reduction of ghost signal components in said processed video signal with respect to said detected video signal.

3. In a television receiver, including means for detecting a video signal which is subject to contamination by ghost signal components, a television signal ghost eliminator comprising:

a transversal filter delay line including an input terminal, an output terminal at which a processed video signal is produced, a plurality of signal processing stages serially coupled between said input and output terminals, and a plurality of input taps, respective ones of which are coupled to respective ones of said signal processing stages;

means for applying said detected video signal to said input terminal;

means for effecting the serial transfer of said applied video signal from said input terminal to said output terminal through said signal processing stages;

means responsive to said processed video signal for developing a plurality of weighting signals; and means for incrementally altering the ghost signal components of said detected video signal in respective ones of said signal processing stages in such manner as to cause reduction of ghost signal components in said processed video signal with respect to said detected video signal, said altering means comprising means for applying respective ones of said weighting signals to respective ones of said input taps.

4. In a television receiver, including means for detecting a video signal which is subject to contamination by ghost signal components, a television signal ghost eliminator comprising:

a transversal filter delay line, including an input terminal, an output terminal at which a processed video signal is produced, a plurality of signal processing stages serially coupled between said input and output terminals, and a plurality of input taps, respective ones of which are coupled to respective ones of said signal processing stages;

means for applying said detected video signal to said input terminal;

means responsive to said processed video signal for developing a plurality of weighting signals;

means for applying respective ones of said weighting signals to respective ones of said input taps; and means for effecting the transfer of said detected video signal from said input terminal to said output terminal through said serially coupled stages, and for effecting the transfer of said applied weighting signals from respective ones of said input taps to said output terminal through ones of said serially coupled stages, whereby the ghost signal components of said processed video signal are reduced with respect to the ghost signal components of said detected video signal.

5. In a television receiver, including means for detecting a video signal including desired signal components, said video signal being subject to contamination by ghost signal components which are ghosts of ones of said desired signal components, a television signal ghost eliminator comprising:

a transversal filter delay line including an input terminal, an output terminal at which a processed video signal is produced, a plurality of signal processing stages serially coupled between said input and output terminals, and a plurality of input taps, respective ones of which are coupled to respective ones of said signal processing stages;

means for applying said detected video signal to said input terminal;

a gate, coupled to said output terminal, for gating a portion of said processed video signal, including a desired signal component and a ghost signal component of said desired signal component;

means for sampling time sequential increments of said gated portion of said processed video signal, including said ghost signal component, and for storing said sampled increments;

means responsive to said stored samples and said processed video signal for developing a plurality of weighting function signals; and means for effecting combination of respective ones of said weighting signals at respective ones of said input taps with said detected video signal as transferred to said respective signal processing stages to which said input taps are coupled in such manner to cause reduction of ghost signal components in said processed video signal with respect to the ghost signal components of said detected video signal.

6. The television signal ghost eliminator of claim 5, wherein said sampling means comprises:

a shift register having an input terminal and a plurality of output terminals;

means for applying said desired signal component to said input terminal of said shift register; and a plurality of sample-and-hold circuits having respective first inputs coupled to receive said gated portion of said processed video signal, respective second inputs coupled to respective ones of said output terminals of said shift register, and respective outputs coupled to said weighting function signal developing means.

7. The television signal ghost eliminator of claim 6, wherein said desired signal component applying means comprises a clipping limiter, and further comprising a plurality of integrators respectively coupled to respective ones of said outputs of said sample-and-hold circuits, and a differentiator coupled between said gate and said clipping limiter and sample-and-hold circuits.

8. The television signal ghost eliminator of claims 5 or 7, wherein said portion of said processed video signal comprises a synchronizing signal interval, and said desired signal component comprises a synchronizing signal.

9. The television signal ghost eliminator of claim 7, further comprising:

a second gate coupled to said input terminal of said transversal filter for gating a portion of said detected video signal, including a desired signal component and a ghost signal component of said desired signal component;

a second differentiator having an input coupled to receive said gated portion of said detected video signal and an output;

a limiter having an input coupled to the output of said second differentiator and an output;

a delay line having an input coupled to the output of said limiter and an output for imparting a delay to signals received from said limiter which is substantially equal to the delay of said transversal filter delay line; and a comparator having a first input coupled to the output of said first-named differentiator, a second input coupled to the output of said delay line, and an output coupled to said first inputs of said sample-and-hold circuits.

10. In a television receiver, including means for detecting a video signal which is subject to contamination by ghost signal components, a television signal ghost eliminator comprising:

a charge transfer device transversal filter including a plurality of serially coupled elements in a charge transfer device, the first of which is coupled to an input terminal and the last of which is coupled to an output terminal at which a processed video signal is produced, and a plurality of input taps respectively coupled to respective ones of said elements of said charge transfer device;

means for applying said detected video signal to said input terminal;

means coupled to said charge transfer device transversal filter delay line for effecting the transfer of said detected video signal through said serially coupled elements of said charge transfer devices;

means responsive to said processed video signal for developing a plurality of weighting signals; and means for effecting combination of respective ones of said weighting signals at respective ones of said input taps with said detected video signal as transferred to said respective elements to which said input taps are coupled in such manner as to cause reduction of ghost signal components in said processed video signal with respect to the ghost signal components of said detected video signal.

* * * * *